United States Patent [19]

Myles, III et al.

[11] Patent Number: 5,655,515

[45] Date of Patent: Aug. 12, 1997

[54] TRACKING SOLAR ENERGY CONCENTRATING SYSTEM HAVING A CIRCULAR PRIMARY AND A COMPOUND SECONDARY

[76] Inventors: John F. Myles, III, Rte. 3, Box 200, Pittsboro, N.C. 27312; Michael H. Nicklas, 1237 Gatehouse Dr., Cary, N.C. 27511; Louis J. Gerics, 804 Sasser St., Raleigh, N.C. 27604

[21] Appl. No.: 638,733

[22] Filed: Apr. 29, 1996

Related U.S. Application Data

[62] Division of Ser. No. 379,841, Jan. 26, 1994, Pat. No. 5,564,410.

[51] Int. Cl.[6] .................................................. F24J 2/38
[52] U.S. Cl. ........................ 126/601; 126/685; 126/692; 126/696
[58] Field of Search ....................... 126/600, 589, 126/684, 688, 692, 693, 696, 574, 601, 685

[56] References Cited

U.S. PATENT DOCUMENTS

| 2,625,930 | 1/1953 | Ham's | 126/621 X |
| 3,868,823 | 3/1975 | Russell et al. | 126/600 X |
| 3,994,435 | 11/1976 | Barr | 126/693 X |
| 4,149,521 | 4/1979 | Miller et al. | 126/693 |
| 4,291,679 | 9/1981 | Kersanage | 126/621 |
| 4,309,984 | 1/1982 | Darbeck | 126/599 |
| 4,579,106 | 4/1986 | Townsend et al. | 126/621 X |

*Primary Examiner*—Larry Jones

[57] ABSTRACT

The present invention relates to a solar energy concentrating system that uses a combination of a circular arcuate primary reflector and a linear compound parabolic secondary collector. The secondary collector can track by swinging in a circular arc above the primary.

6 Claims, 15 Drawing Sheets

TRACKING SOLAR ENERGY CONCENTRATING SYSTEM HAVING A CIRCULAR PRIMARY AND A COMPOUND SECONDARY

The present application is a divisional, non-provisional application of Ser. No. 08/379,841, filed Jan. 26, 1994, now U.S. Pat. No. 5,564,410.

TECHNICAL FIELD

The present invention relates to a solar energy concentrating system that uses a combination of a circular arcuate primary reflector and a linear compound parabolic secondary collector. The secondary collector can track by swinging in a circular arc above the primary.

RELATED APPLICATIONS

The weathertight roof portion of the present invention is described in modular form described in an application entitled "A Roof Module Having an Integral Solar Energy Concentrator", filed concurrently herewith, and incorporated by reference hereto.

The present invention also can incorporate the use of replaceable solar energy concentrating reflectors as described in an application entitled "An Improved Solar Energy Concentrating System Having Replaceable Reflectors", filed concurrently herewith, and incorporated by reference hereto.

BACKGROUND ART

In the past, if solar energy concentrating systems were used on top of buildings or roofed structures to gather radiant solar energy, then one could select from two options. The first option was simply to take a solar energy concentrating system suitable for use on the ground and mount it up on top of a roofed structure. While such an approach did gather radiant solar energy, it also required that the roof support a substantially greater weight. This add-on approach resulted in substantially higher capital costs. Moreover, once the system was atop the roofed structure, inevitably the underlying roof would need repair. The presence of the system atop the roof in a non-integrated fashion increased the ease and cost of making roof repairs.

The second option was to make a substantial portion of the roof into a solar energy concentrating reflector. An example of this unitary reflector approach can be found in U.S. Pat. No. 3,994,435 to Barr. While Barr no longer had the disadvantage of added supporting structure as in the add-on approach, Barr had to make compromises in gathering the radiant solar energy. The semi-cylindrical reflector and fixed collector did not collect as much solar energy as ground-based units with better geometries. Also, Barr required that the underlying building have a shape similar to the reflector, and thus, the ends of the Bart building had to swoop arcuately upwards, mimicking the reflector arc. Such a requirement had obvious disadvantages in being used on the numerous flat roofed buildings and roofed structures which are used for commercial or industrial purposes.

SUMMARY OF THE INVENTION

The present invention relates to a roof having an integral solar energy concentrating system. A combination of solar energy concentrating reflectors and reflected solar energy collectors is used, among other solar energy concentrating or energy transferring elements, to gather radiant solar energy striking a roof atop a building or roofed structure. Either the reflectors or reflector backing panels are integrated into other roof structure elements so as to form a weathertight roof. Thus, the present invention results in a lower weight and lower cost way of collecting radiant solar energy from atop a building or roofed structure. One of ordinary skill in the art would appreciate that because the present invention is exposed to the weather, that the selection of materials in constructing the present invention must take into account the effects weather has at the site of use.

The present roof comprises a number of elements, starting with a plurality of roof spanning members. (For the purposes of the present invention, a "roof spanning member" includes conventional load bearing structures for supporting roofs such as trusses or beams.) Each roof spanning member spans from a first upright load-bearing building member of a roofed structure to a second upright load-bearing building member of the roofed structure. (For the purposes of the present invention, an "upright load-bearing building member" includes conventional means of supporting roof spanning members, such as walls or columns.) Each roof spanning member is separated from an adjacent roof spanning member by a distance at least sufficient to allow a reflector backing panel or a solar energy concentrating reflector to be disposed within that distance. For practical commercial purposes, the minimum distance between adjacent roof spanning members is at least 8 feet, and the minimum length for the roof spanning members is at least 16 feet. However, depending upon the choice of roof spanning design and material, much greater distances can be spanned, as is known to those of ordinary skill in the art. Each roof spanning member has a plurality of upper panel support points, a plurality of lower panel support points or a combination of upper panel support points and lower panel support points. These panel support points are for attaching and supporting either a reflector backing panel, as a first main variant of the present invention, a reflector, as in the second main variant, or non-reflective roofing panels that may be substituted for either a reflector or a reflector backing panel. The lower panel support points are spaced outward from and down from the upper support points. The plurality of roof spanning members are dimensioned and configured to support the weight of all of the roof-supported elements in the following paragraphs, as well as conventional roof-mounted dead loads and live loads known to those of ordinary skill in the art.

Roof With Reflector Backing Panels

In the first variant of the present invention, a plurality of reflector backing panels is used as part of the weathertight roofing surface. At least one reflector backing panel is disposed between adjacent roof spanning members. Each reflector backing panel has a concave and cylindrically arcuate configuration of up to 180 degrees, a lower edge, an upper edge, and curved lateral edges. (For the purposes of the present invention, "lower" and "upper" with respect to the reflectors or the reflector backing panels do not express, necessarily, a relative position between the edges. For example, if a reflector has a 180 degree configuration, then these edges may be equidistant in height with respect to its supporting surface.) The reflector backing panels can be disposed laterally adjacent to one another between adjacent roof spanning members so as to form a row for up to the entire length of the roof spanning members. At least one of the curved lateral edges of at least one reflector backing panel disposed in each row attaches either to the upper panel support points of the underlying roof spanning member, to the lower panel support points of the underlying roof spanning member, or to a combination of such upper panel support points and lower panel support points. Each reflector backing panel is disposed such that the skyward surface is the concave surface. Also, each reflector backing panel is dimensioned and configured along the curved lateral edges wherein the curved lateral edge of a reflector backing panel can be placed adjacent along the curved lateral edge of another reflector backing panel for the length of the underlying roof spanning member so as to form the row of adjacent reflector backing panels. One of ordinary skill in the art can use various materials to construct the above reflector backing panel, including fabricated metals or alloys, and molded laminates or composites.

On top of each reflector backing panel lies a reflector. Thus, the first variant of the present invention also comprises a plurality of solar energy concentrating reflectors. Because a reflector backing panel is present, the reflector can be flexible and can rely upon an underlying reflector backing panel to provide the correct configuration. If the reflector is not substantially flexible, then, the reflector has a concave and cylindrically arcuate configuration complementary to the underlying reflector backing panel. As in conventional solar energy concentrating systems, each reflector has a skyward facing surface that reflects radiant solar energy. Each reflector has an upper edge, a lower edge, and curved lateral edges. Finally, each reflector is disposed on top of the skyward surface of an underlying reflector backing panel, being attached thereto by conventional means, including mechanical fastening means or adhesive means.

As part of the roofing elements that form a weathertight seal, the present invention includes a plurality of spanning member cap means. In the first variant, each spanning member cap means is connected either to the top of a roof spanning member, the upper edge of a reflector, or the upper edge of a reflector backing panel. Each spanning member cap means extends lengthwise for the length of the roof spanning member and extends laterally across the roof spanning member. Each spanning member cap means is dimensioned and configured so as to form a weathertight seal with either the reflector backing panels or the reflectors, and the roof spanning member over which the spanning cap means is disposed.

Another weathertight roofing element is the end cap means. The present invention includes a plurality of end cap means, each being situated or disposed at the outside or end of the roof spanning member, so as to seal the exposed area formed by the reflector backing panel and its reflector. Each end cap means is connected to roof elements such as an outside reflector, an outside reflector backing panel, an outside spanning member cap means, or an outside load-bearing building member. An end cap means may be unitary or formed from several parts. However, regardless of the method of fabrication, each end cap means is dimensioned and configured so as to form a weathertight seal with the roof elements to which the end cap means is connected, thus, sealing the roof. One of ordinary skill in the art, appreciates that the end cap means can vary even within the use on one roof. For example, one wall of a building may be raised above the roof spanning member so as to equal or exceed the height of the part of the spanning member cap means, whereas another wall may reach only to the bottom of the reflector backing panel. Thus, in the former case, the end cap means would simply provide a flashing to the wall for the reflector backing panel or the reflector, and the roof spanning member or the spanning member cap means. However, in the latter case, the end cap means would include a panel having a surface that covers the exposed arcuate area formed by the reflector backing panel or the reflector, and the roof spanning member or the spanning member cap means.

In order to keep leaks from occurring between adjacent reflector backing panels or reflectors, the present invention includes a plurality of weathertight panel sealing means. The panel sealing means, of conventional design, are located at various seams including at the curved lateral edges, the upper edge, and the lower edge of each reflector backing panel, at the curved lateral edges, the upper edge, and the lower edge of each reflector, or a combination of the above.

In addition to the roofing structure and the weathertight sealing elements, the present invention also comprises elements necessary to gather the reflected solar energy from the reflector. In order to support reflected solar energy collectors, a plurality of collector support means are used. A collector support means is disposed above each row of adjacent reflectors so as to support a collector and allow the collector to move within a predetermined focal zone for collecting solar energy reflected from the stationary reflectors. Each collector support means can comprise a plurality of collector support members which attach to adjacent spanning member cap means or the underlying roof spanning member. Thus, the collector support members span from the top of a first roof spanning member to the top of a second adjacent roof spanning member and have a means for allowing the collector to move in a predetermined path. At least two collector support members are disposed along each row of adjacent reflectors, between said first spanning member and second spanning member. Of course one of ordinary skill in the art may vary the number and placement of the collector support members. In some embodiments, at the end row of reflectors, the collector support members may span from a roof spanning member to a support surface such as the outside wall of the building. However, in total, the collector support members for a collector are dimensioned and configured so as to support that collector, as exposed to the forces of the weather at the roof site.

The necessary partner of the reflector is a reflected solar energy collector. Thus, the present invention includes a plurality of collectors, each collector extending lengthwise across the curved lateral edges of a row of adjacent reflectors. For support each collector is connected to at least two collector support members so as to be disposed to move within a predetermined focal collection zone. Finally, each collector is dimensioned and configured to receive the reflected solar energy into a conduit through which an energy transfer fluid can flow, the fluid being heated by the reflected solar energy. One of ordinary skill in the art can select from a number of commercially available fluids known for this use. As to the cross-sectional shape of the collector, a number of disclosed designs are suitable for the present invention, such as the use of compound parabolic collectors with cylindrically arcuate reflectors, and are known to those of ordinary skill in the art.

In order to maximize the solar energy gathering of the reflector/collector combination, the present invention uses a means for positioning each collector in an optimal position within the focal collection zone throughout a defined solar cycle, such as the diurnal cycle. The positioning means is connected to the moveable portion of each collector support means. One of ordinary skill in the art can appreciate that the positioning means can be designed in a variety of ways. For example, the positioning means can comprise an integrated means that couples all of the collectors together through a mechanical means such as gears and chain, moving all the collectors at once. Alternatively, the positioning means can comprise a number of elements, each moving a single collector, such an electrical motor attached to each collector support means.

Finally, the present invention includes a fluid transport means which connects the conduit from each collector to a thermal energy use means or an energy storage means. The fluid transport means circulates the solar energy-heated fluid through the plurality of conduits. Any number of conventional arrangements or systems can be used, and are known to those of ordinary skill in the art.

Roof Without Reflector Backing Panels

The second variant of the present invention differs from the first in that a plurality of reflectors is used as part of the weathertight roofing surface, without the need for reflector backing panels. Thus, the roof comprises a number of elements, starting with a plurality of roof spanning members as described above in the first variant. Above the roof spanning members lie the reflectors. Each reflector has a concave and cylindrically arcuate configuration of up to 180 degrees, a lower edge, an upper edge, and curved lateral edges. The reflectors are disposed adjacent to one another above the roof spanning members so as to form a row for up to the entire length of the roof spanning member. At least one of the curved lateral edges of at least one reflector disposed in each row attaches either to the upper panel support points of the underlying roof spanning member, to the lower panel support points of the underlying roof spanning member, or to a combination of such upper panel support points and lower panel support points. Each reflector is disposed such that the skyward surface is the concave surface. As in conventional solar energy concentrating systems, each reflector has a skyward facing surface that reflects radiant solar energy. Also, each reflector is dimensioned and configured along the curved lateral edges wherein the curved lateral edge of a reflector can be placed adjacent along the curved lateral edge of another reflector for the length of the underlying roof spanning member so as to form the row of adjacent reflectors. One of ordinary skill in the art can use various materials to construct a reflector, including fabricated metals or alloys with polished or reflectorized surfaces, and molded laminates or composites with reflectorized surfaces.

As in the first variant, the present invention includes a plurality of spanning member cap means. Each spanning member cap means is connected either to the top of a roof spanning member or the upper edge of a reflector. Each spanning member cap means extends lengthwise for the length of the roof spanning member and extends laterally across the roof spanning member. Each spanning member cap means is dimensioned and configured so as to form a weathertight seal with the reflectors and the roof spanning member over which the spanning cap means is disposed.

Another weathertight roofing element is the end cap means. The present invention includes a plurality of end cap means, each being situated or disposed at the end of the roof spanning member, so as to seal the exposed area formed by the reflector. Each end cap means is connected to roof elements such as an outside reflector, an outside spanning member cap means, or an outside load-bearing building member. An end cap means may be unitary or formed from several parts. However, regardless of the method of fabrication, each end cap means is dimensioned and configured so as to form a weathertight seal with the roof elements to which the end cap means is connected, thus, sealing the roof. One of ordinary skill in the art, appreciates that the end cap means can vary even within the use on one roof. For example, one wall of a building may be raised above the roof spanning member so as to equal the height of the part of the spanning member cap means, whereas another wall may reach only to the bottom of the reflector. Thus, in the former case, the end cap means would simply provide a flashing to the wall for the reflector and the roof spanning member or the spanning member cap means. However, in the latter case, the end cap means would include a panel having a surface that covers the exposed arcuate area formed by the reflector, and the roof spanning member or the spanning member cap means.

In order to keep leaks from occurring between adjacent reflectors, the present invention includes a plurality of weathertight panel sealing means. The panel sealing means, of conventional design, are located at various seams including at the curved lateral edges, the upper edge, and the lower edge of each reflector.

In addition to the roofing structure and the weathertight sealing elements, the second variant of the present invention also comprises elements necessary to gather the reflected solar energy from the reflector. These elements, the collector support means, the solar energy collector, the collector positioning means, and the fluid transport means are as described above in the first variant.

PREFERRED EMBODIMENTS

Single Row Roof Embodiments

Figure 1:
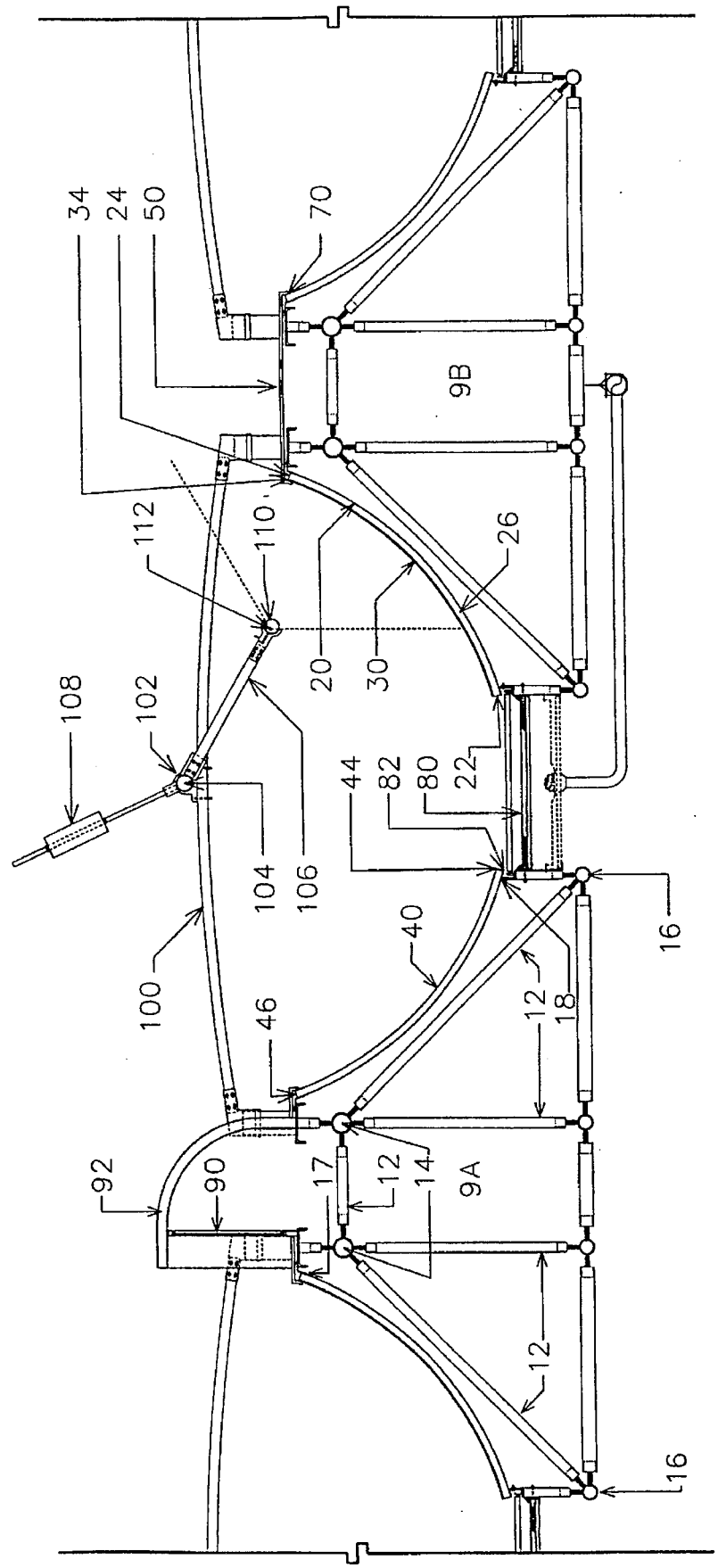
FIG. 1 is a sectional view of an embodiment of the present invention using a complex space truss, an upright daylighting means, and a gutter means.

One preferred embodiment of the present invention uses a design wherein only one row of reflectors having an arcuate configuration of up to about 120 degrees is placed between adjacent roof spanning members, or a roof spanning member and an outside wall. A non-reflective roofing panel is used to extend from the lower edge of the reflector to the top of the roof spanning member nearest the lower edge of that reflector. This embodiment can have two main variants, one that uses reflector backing panels, and another that does not. In both, the roof comprises a plurality of roof spanning members as described above.

Using Reflector Backing Panels

In the first variant of the single reflector row embodiment, a plurality of reflector backing panels is used as part of the roofing surface. Each reflector backing panel has a concave and cylindrically arcuate configuration of up to about 120 degrees, a lower edge, an upper edge, and curved lateral edges. The reflector backing panels are disposed adjacent to one another in a single row between adjacent roof spanning members for up to the entire length of the roof spanning members. At least one of the curved lateral edges of at least one reflector backing panel disposed in each row attaches either to the upper panel support points of the underlying roof spanning member, to the lower panel support points of the underlying roof spanning member, or to a combination of the above. Each reflector backing panel is disposed such that the skyward surface is the concave surface. Also, each reflector backing panel is dimensioned and configured along the curved lateral edges wherein the curved lateral edge of a reflector backing panel can be placed laterally adjacent along the curved lateral edge of another reflector backing panel for the length of the underlying roof spanning member so as to form the row of adjacent reflector backing panels. One of ordinary skill in the art can use various materials to construct a reflector backing panel, including fabricated metals or alloys, and molded laminates or composites. Preferably, the reflector backing panel is a sandwich laminate having aluminum sheet skin on either side and a core of insulating structural foam.

Non-reflective roofing panels are used to close the gap between the lower edge of a reflector backing panel and the top of the roof spanning member closest to the lower edge of the reflector backing panel or to a load-bearing upright building member closest to the lower edge of the reflector backing panel. Each non-reflective roofing panel has lateral edges, a lower edge, and an upper edge. The non-reflective roofing panel can be curved or flat. The lower edge of the non-reflective roofing panel attaches either to the lower edge of an adjacent reflector backing panel or to a lower panel support point. The upper edge of the non-reflective roofing panel either attaches to the top of a roof spanning member adjacent to the roof spanning member supporting the upper edge of the adjacent reflector backing panel, said roof spanning member being closest to the lower edge of the reflector backing panel, attaches to an upper panel support point on said adjacent roof spanning member, or attaches to a load-bearing upright building member close to the lower edge of the reflector backing panel. Each non-reflective roofing panel is dimensioned and configured along the lateral edges wherein the lateral edge of a non-reflective roofing panel can be placed adjacent to the lateral edge of another non-reflective roofing panel for the length of the underlying roof spanning member, so as to form a row of adjacent non-reflective roofing panels, along with the row of reflectors, between adjacent roof spanning members.

On top of each reflector backing panel lies a reflector. Thus, this first variant also comprises a plurality of solar energy concentrating reflectors. Each reflector can be flexible and rely upon an underlying reflector backing panel for support, or a reflector can have a concave and cylindrically arcuate configuration complementary to the underlying reflector backing panel. As in conventional solar energy concentrating systems, each reflector has a skyward facing surface that reflects radiant solar energy. Each reflector has an upper edge, a lower edge, and curved lateral edges. Finally, each reflector is disposed on top of the skyward surface of an underlying reflector backing panel.

As part of the roofing elements that form a weathertight seal, the present preferred embodiment includes a plurality of spanning member cap means, end cap means, and a plurality of weathertight panel sealing means, all as described above.

In addition to the roofing structure and the weathertight sealing elements, the present preferred embodiment also comprises elements necessary to gather the reflected solar energy from the reflector, namely, a plurality of collector support means, a plurality of reflected solar energy collectors, a means for positioning each collector in an optimal position within the focal collection zone, and a fluid transport means, all as described above.

Figure 5:
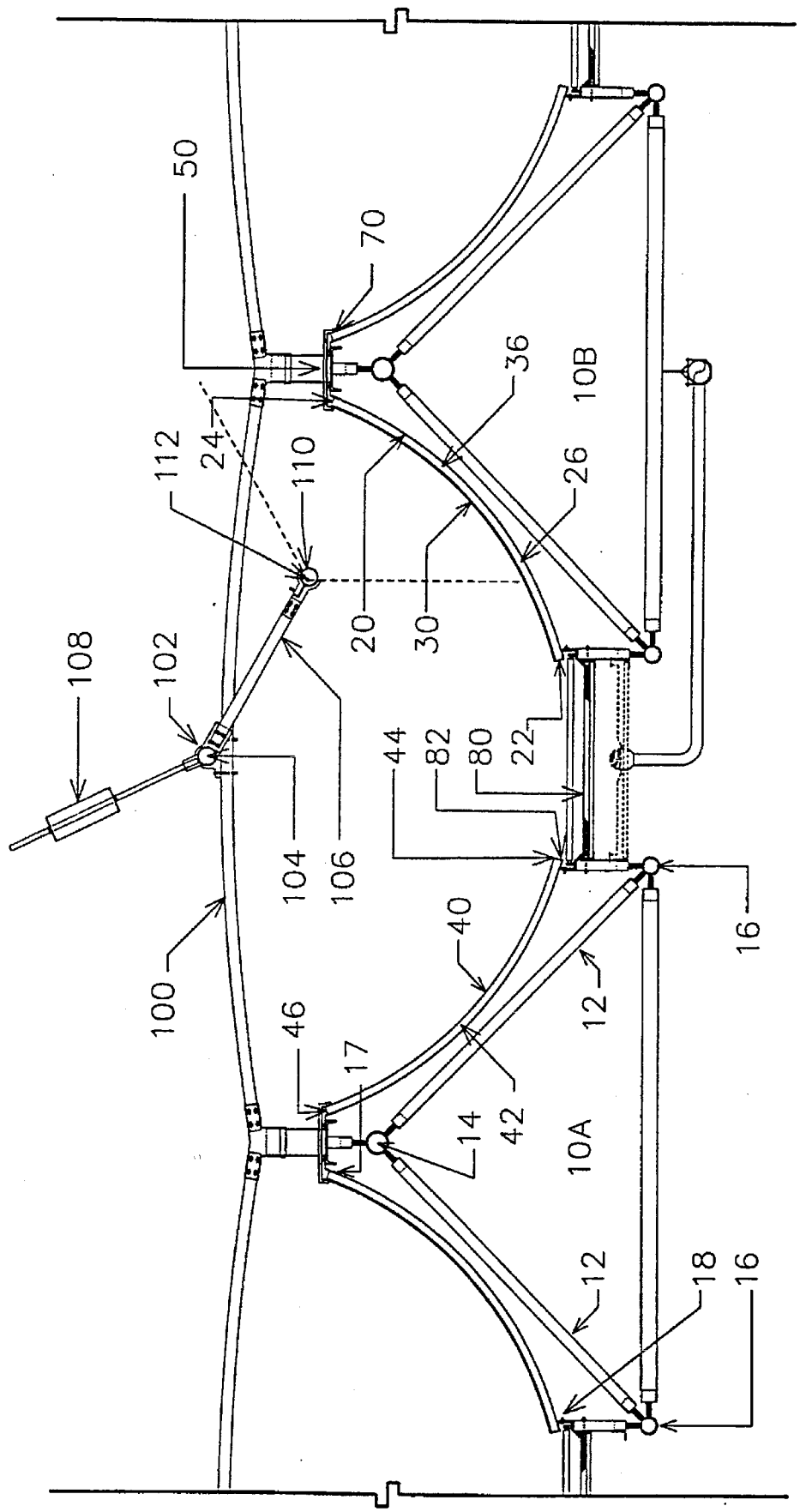
FIG. 5 is sectional view of an embodiment of the present invention using a simple space truss and a single row of reflectors.
Figure 6:
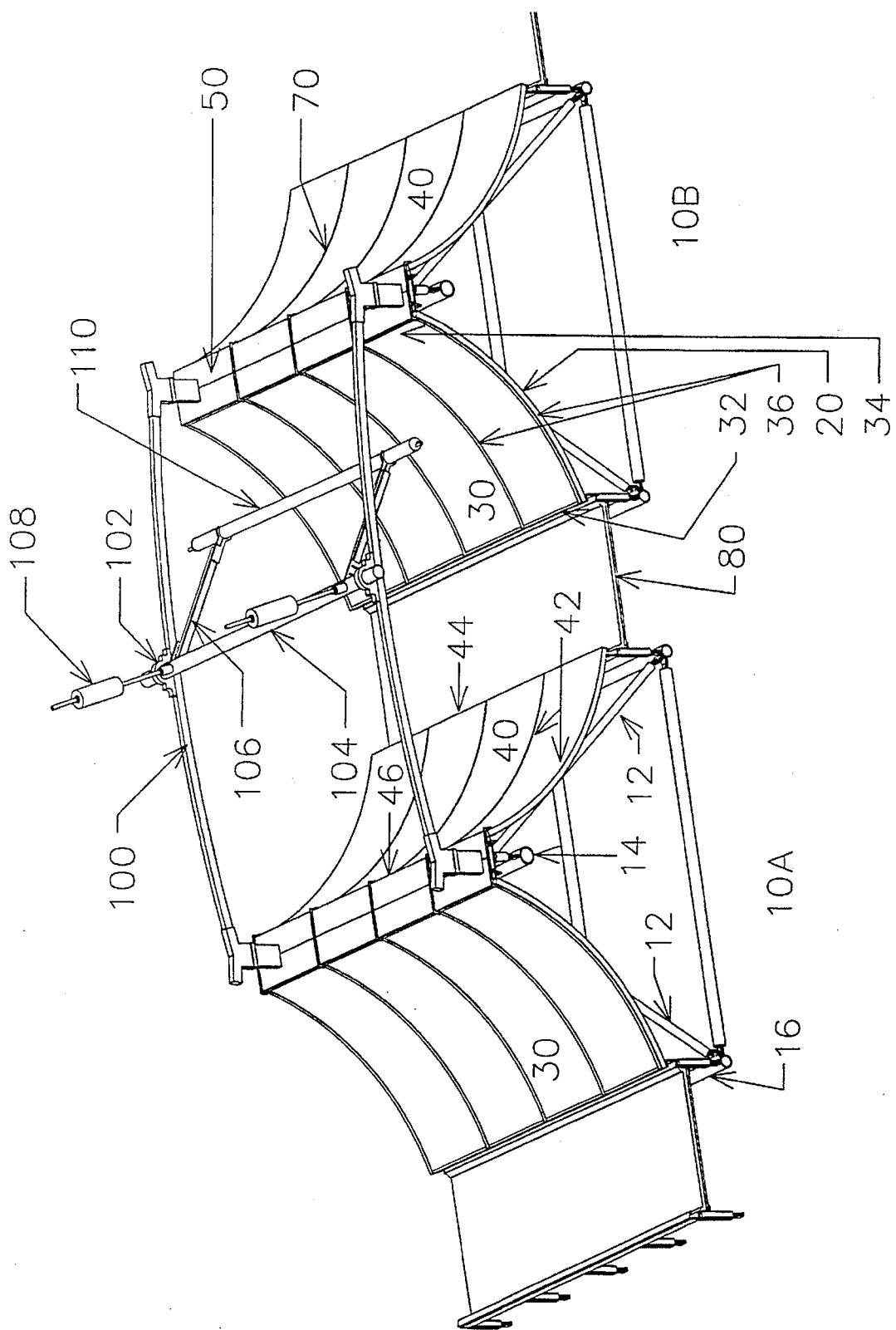
FIG. 6 is an isometric view of an embodiment of the present invention using a simple space truss and a single row of reflectors.
Figure 7:
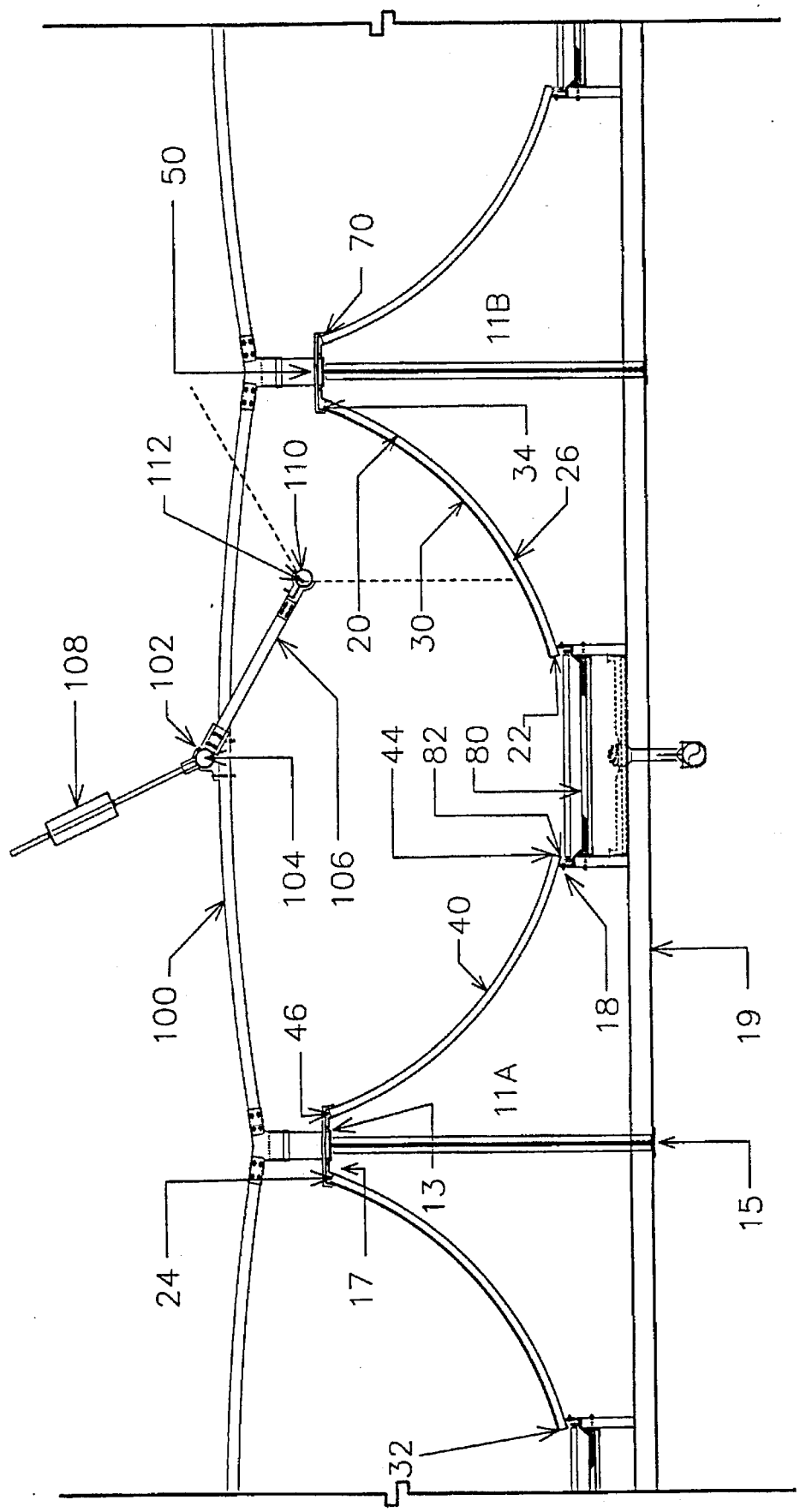
FIG. 7 is sectional view of an embodiment of the present invention using a flat truss and a single row of reflectors.
Figure 8:
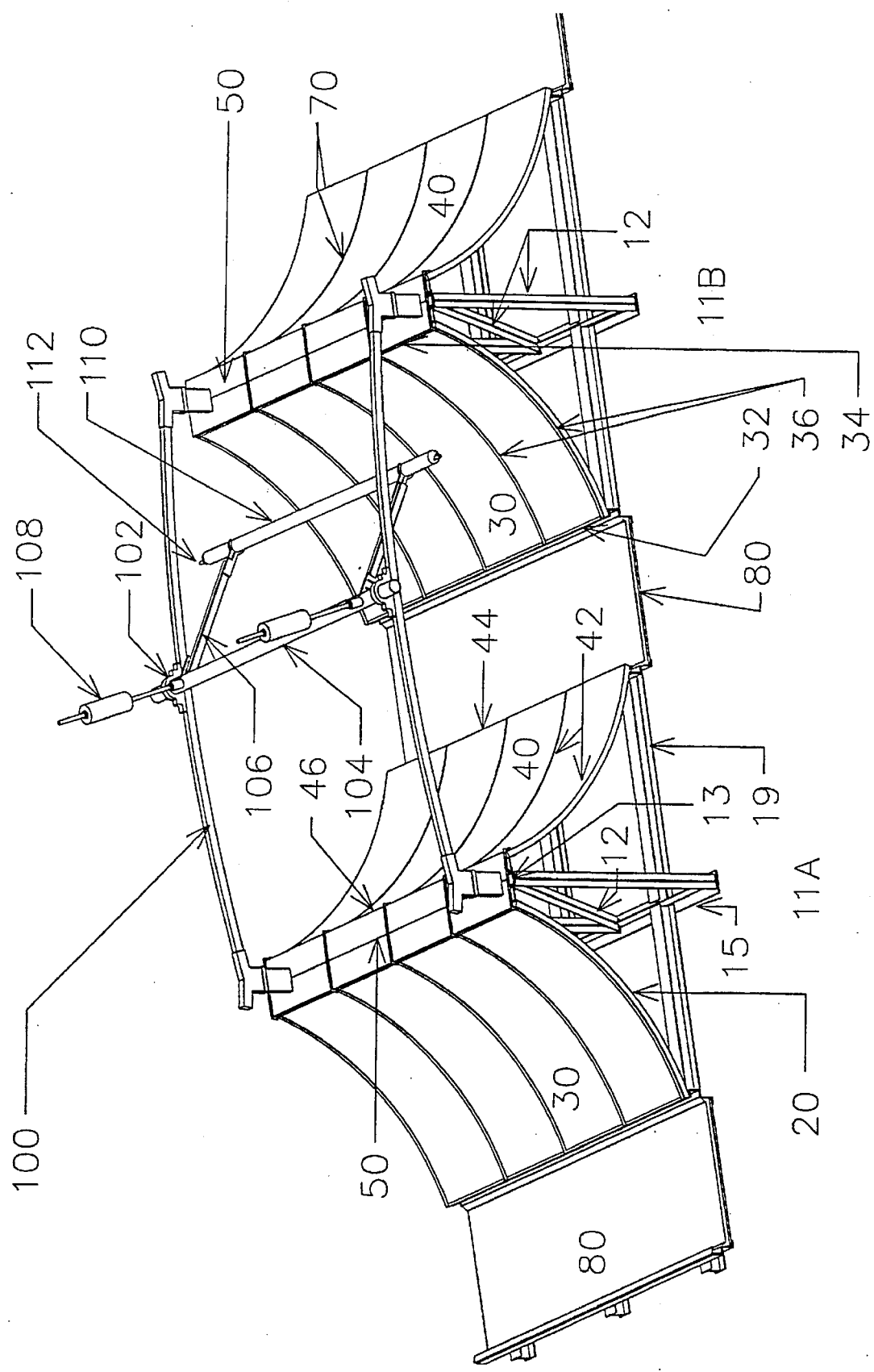
FIG. 8 is an isometric view of an embodiment of the present invention using a flat truss and a single row of reflectors.

FIGS. 5 and 6 illustrate the variant of the single reflector row design that uses reflector backing panels. If a new structure is being built, then one would prefer to orient the roof spanning members of the new structure such that the collector in the present invention is oriented in a lengthwise direction, i.e., follows the direction formed by the lower edge of the reflectors, which is within 30 degrees of a true East-West axis. However, the present invention can be used on structures having any orientation. In this preferred embodiment, a plurality of simple space trusses (10A and 10B) are used as the roof spanning members. Each simple space truss has a plurality of web members (12) disposed between an upper chord (14) and two lower chords (16), one on either side of and below the upper chord. A plurality of web members (12) connect the upper chord to the lower chords. Upper panel support points (17) are located near the upper chord, and the lower panel support points (18) are located near the lower chords, on top of short vertical members. The simple space trusses are dimensioned and configured to support the weight of all of the roof supported elements described below, as well as conventional dead loads, such as roof-mounted air conditioning elements, and live loads, such as wind and snow. Alternatively, FIGS. 7 and 8 show the same system except using flat trusses (11A and 11B) instead of simple space trusses.

With the present roof, a reflector backing panel (20) underlies each solar energy concentrating reflector (30). This reflector backing panel has a concave and cylindrically arcuate configuration of up to about 120 degrees, a lower edge (22), an upper edge (24), and curved lateral edges (26). The reflector backing panels are dimensioned and configured along the curved lateral edges such that one reflector backing panel can be located laterally adjacent to another reflector backing panel so as to form a row of reflector backing panels extending for up to the length of the underlying space truss. In addition, the reflector backing panel is made so as to provide dimensional or configurational stability to the overlying reflector. Suitable embodiments of the reflector backing panel include a sandwich laminate having aluminum sheet skin on either side of a core of insulating structural foam.

A plurality of flexible solar energy concentrating reflectors are used. Each reflector (30) is flexible enough to assume a concave and cylindrically arcuate configuration complementary to the underlying reflector backing panel. Each reflector has a lower edge (32), an upper edge (34), and, when in place, curved lateral edges (36). The skyward surface of the reflector is the concave surface. Each reflector is dimensioned and configured along the lateral edges such that one reflector can be located adjacent to another reflector so as to form a row of reflector extending for up to the length of the underlying space truss. Such a reflector can be comprised of a ultraviolet-stabilized plastic having a reflectorized concave surface. Particularly suitable for reflectors is an ultraviolet-stabilized acrylic having a thickness of 1.6 mm wherein the underside of the concave surface of the acrylic has aluminum vapor-deposited thereon, providing a reflectivity of at least 75%, preferably at least 90%. Alternatively, the reflector can be made from co-extruded polymers having a reflectivity based on the difference in the indices of refraction of the two polymers.

Non-reflective roofing panels are used to close the gap between the lower edge of a reflector and the top of the roof spanning member closest to the lower edge of the reflector or to a load-bearing upright building member closest to the lower edge of the reflector panel. Each non-reflective roofing panel (40) has lateral edges (42), a lower edge (44), and an upper edge (46). The lower edge attaches to a lower panel support point. The upper edge attaches to an upper panel support point on top of a simple space truss (10A) adjacent to the simple space truss (10B) supporting the upper edge of the adjacent reflector. Each non-reflective roofing panel is dimensioned and configured along the lateral edges wherein the lateral edge of a non-reflective roofing panel can be placed adjacent to the lateral edge of another non-reflective roofing panel extending for up to the length of the underlying roof spanning member, so as to form a row of adjacent non-reflective roofing panels.

As part of the roofing elements that form a weathertight seal, the present invention includes a plurality of spanning member cap means (50). Each spanning member cap means is connected to the top of a roof spanning member. Each spanning member cap means extends lengthwise for the length of the roof spanning member and extends laterally across the roof spanning member. As shown in the FIGURES, each spanning member cap means is dimensioned and configured so as to form a weathertight seal with the reflector backing panels, the non-reflective roofing panels, and the roof spanning member over which the spanning cap means is disposed.

Figure 9:
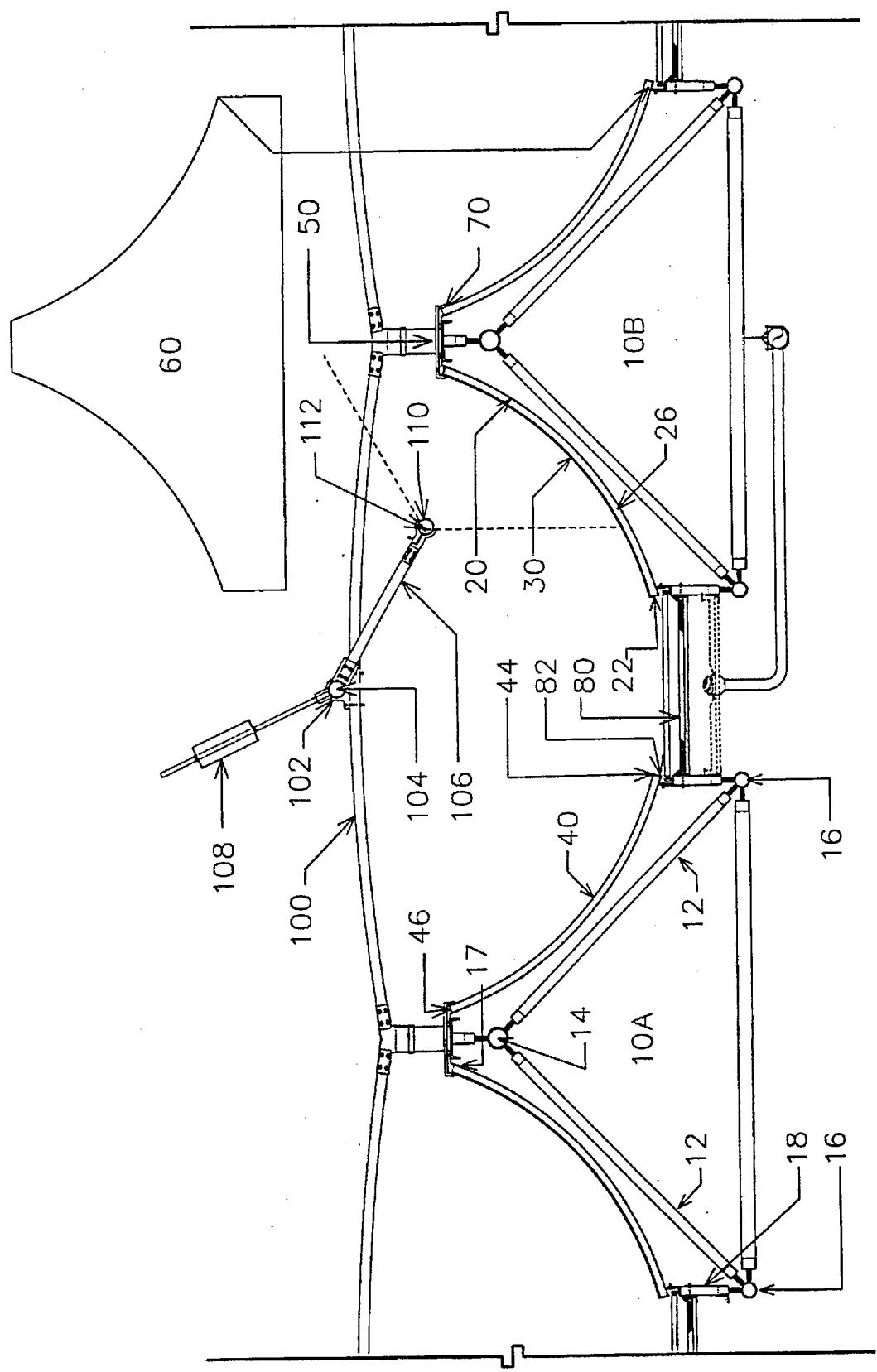
FIG. 9 is a sectional view of an embodiment of the present invention highlighting an end cap means.
Figure 10:
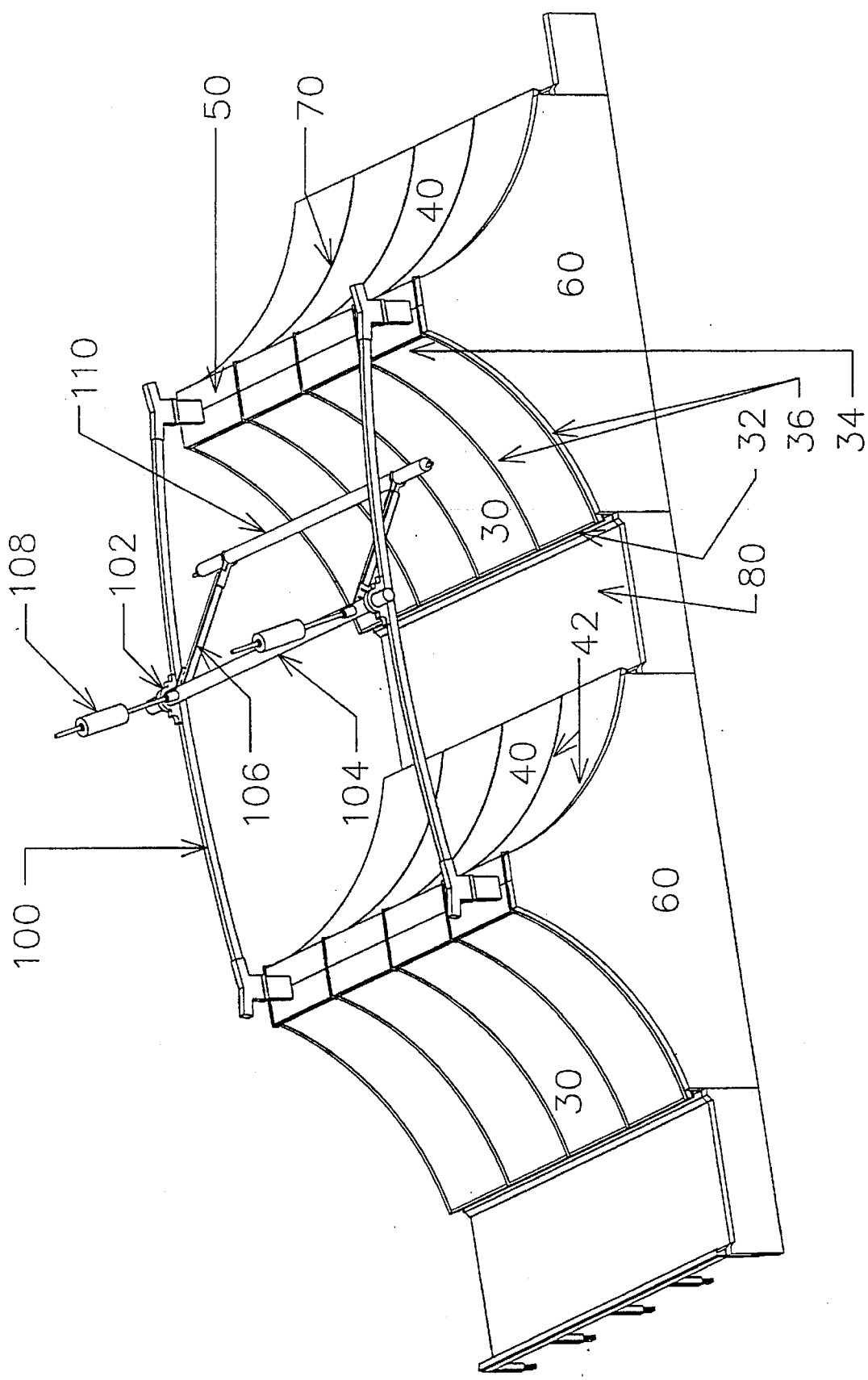
FIG. 10 is an isometric view of an embodiment of the present invention highlighting an end cap means.
Figure 11:
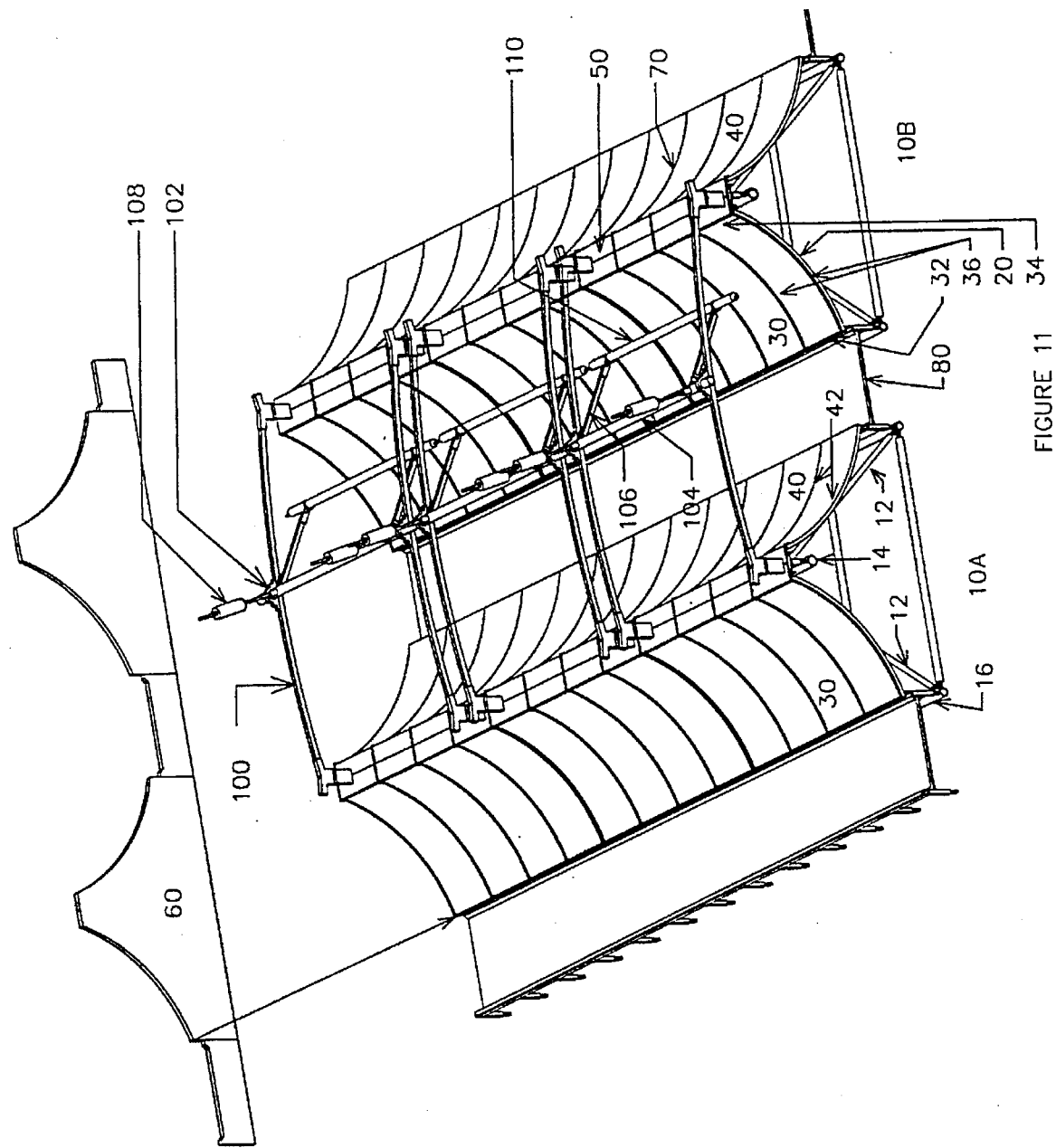
FIG. 11 is an isometric view of the present roof.
Figure 12:
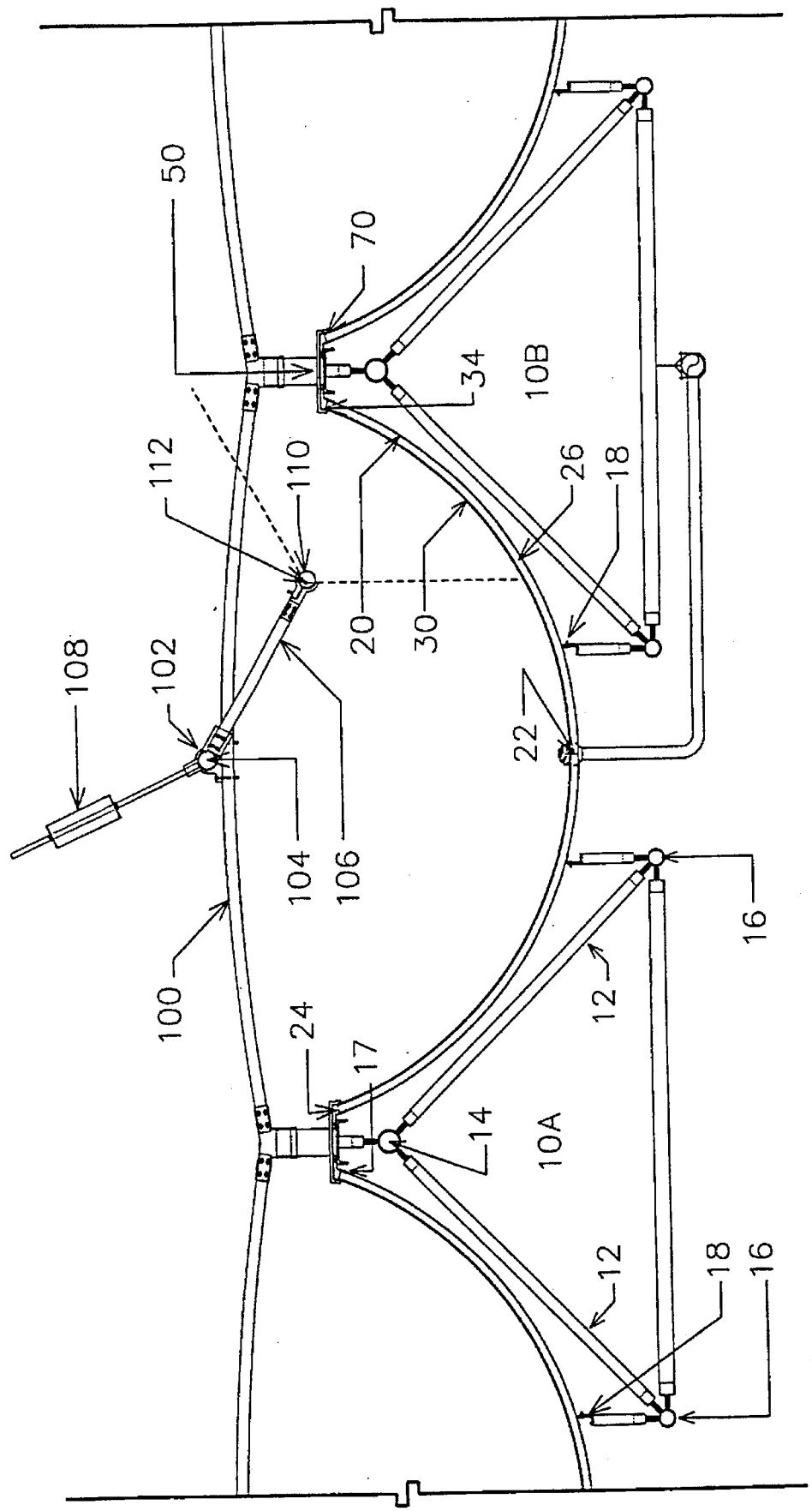
FIG. 12 is a sectional view of an embodiment of the present invention using no gutter means and a double row of reflectors.
Figure 13:
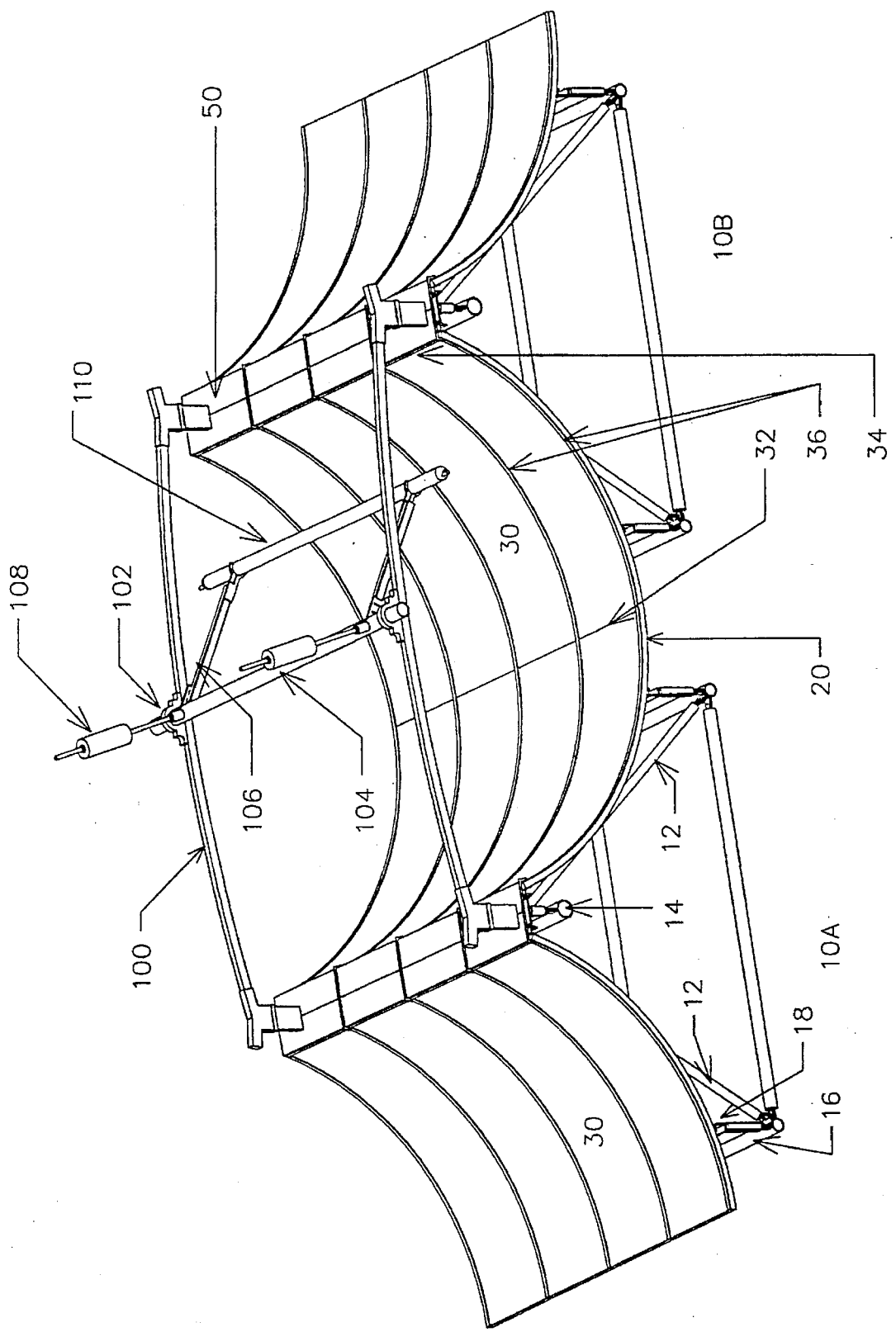
FIG. 13 is an isometric view of an embodiment of the present invention using no gutter means and a double row of reflectors.

Another weathertight roofing element is the end cap means, as shown in FIGS. 9, 10, and 11. The present roof includes a plurality of end cap means, each end cap means (60) being situated or disposed at the outside or end of the roof spanning member, so as to seal the exposed end formed by the reflector backing panel and its reflector. Each end cap means is connected to an outside reflector backing panel, an outside non-reflective panel, or the outside spanning member cap means. Each end cap means is dimensioned and configured so as to form a weathertight seal with the roof elements to which the end cap means is connected, thus, sealing the roof.

In order to keep leaks from occurring between adjacent reflector backing panels or reflectors, the present invention includes a plurality of weathertight panel sealing means. The panel sealing means (70), of conventional design, are located at various seams including at the lateral edges, the upper edge, and the lower edge of each reflector backing panel, at the lateral edges, the upper edge, and the lower edge of each non-reflective roofing panel.

A collector support means spans above and across the row of reflectors, extending from the spanning member cap means of a first roof spanning member (10A) to the spanning member cap means of a second roof spanning member (10B). As shown in FIGS. 5 and 6, the collector support means comprises two arches (100) as the collector support members. Each arch spans from the spanning member cap means (50) on one space truss to the spanning member cap means of a second space truss. A bearing means (102) is located on each arch. A drive shaft (104) is connected to the bearing means on each arch so as to comprise a rotating means located at the center of curvature for the underlying reflector. Lower support members (106) are connected to the drive shaft.

A reflected solar energy collector (110) is connected to the collector support means by the lower support members. The preferred collector for a cylindrically arcuate reflector has a compound parabolic design, as disclosed in U.S. Pat. No. 5,274,497 to Winston. The collector has a conduit (112) through which an energy transfer fluid can be heated and circulated.

The drive shaft is located at the center of curvature for the solar energy concentrating reflector. The lower support members (106) are dimensioned such that the solar energy collector is located down from the center of curvature by a distance L plus or minus 5% according to the formula: L=(R*1.1)/2; where R equals the radius of the curvature of the solar energy concentrating reflector. The above arrangement of elements allows the solar energy collector to move within a predetermined and defined focal zone for collecting reflected solar energy from the solar energy concentrating reflector.

In preferred embodiments, a counterweight (108) is attached to the drive shaft (104). The counterweight extends up from the drive shaft member at an angle and a distance with respect to the collector and having a sufficient mass or weight such that if a means for positioning the collector is disconnected from controlling the rotating means, then the counterweight rotates the collector outside of the focal collection zone.

A means for positioning the collector is connected to the drive shaft (104). The positioning means comprises an electrical motor hooked to a microprocessor which can keep the collector in an optimal position for collecting reflected solar energy throughout the diurnal solar cycle. The positioning means has an electromagnetic clutch which can disconnect control of the step motor over the position of the drive shaft member, (not shown). A signal, or a lack of one, can come from one of three means (not shown)—a temperature sensor means, a pressure sensor means, or a position sensor means. In some embodiments, a combination of such elements can be used. If the signal, or a lack thereof, indicates conditions outside of predetermined limits, then the electromagnetic clutch releases the drive shaft and the collector is automatically moved away from the optimal position in the focal collection zone by gravity.

A fluid transport system (not shown) connects the conduit of each collector to a thermal energy use means or an energy storage means. The fluid transport means circulates the solar energy-heated fluid. Suitable energy transfer fluids include distilled water, but more preferably for high temperature application include silicone heat transfer fluid (HTF), organic synthetic HTF, or inhibited glycol HTF.

Using Reflectors Without Reflector Backing Panels

In the second variant of the single row reflector embodiment of the present invention, a plurality of reflectors is used as part of the roofing surface, without the need for reflector backing panels. The roof comprises a plurality of roof spanning members, as described above. Each reflector has a concave and cylindrically arcuate configuration of up to about 120 degrees, a lower edge, an upper edge, and curved lateral edges. The reflectors are disposed adjacent to one another in a single row between adjacent roof spanning members for up to the entire length of the roof spanning members. At least one of the curved lateral edges of at least one reflector disposed in each row attaches either to the upper panel support points of the underlying roof spanning member, to the lower panel support points of the underlying roof spanning member, or to a combination of the above. Each reflector is disposed such that the skyward surface is the concave surface. As in conventional solar energy concentrating systems, each reflector has a skyward facing surface that reflects radiant solar energy. Also, each reflector is dimensioned and configured along the curved lateral edges wherein the curved lateral edge of a reflector can be placed adjacent along the curved lateral edge of another reflector for the length of the underlying roof spanning members so as to form the single row of adjacent reflectors between adjacent roof spanning members. One of ordinary skill in the art can use various materials to construct a reflector including fabricated metals or alloys with polished or reflectorized surfaces, and molded laminates or composites with reflectorized surfaces.

Non-reflective roofing panels are used to close the gap between the lower edge of the reflectors and the top of the roof spanning member closest to the lower edge of the reflector or to a load-bearing upright building member closest to the lower edge of the reflector panel. Each non-reflective roofing panel has lateral edges, a lower edge, and an upper edge dimensioned and configured as described above. The lower edge attaches either to the lower edge of an adjacent reflector or to a lower panel support point. The upper edge either attaches to the top of a roof spanning member adjacent to the roof spanning member supporting the upper edge of the adjacent reflector, said roof spanning member being closest to the lower edge of the reflector, attaches to an upper panel support point on said adjacent roof spanning member, or attaches to a load-bearing upright building member close to the lower edge of the reflector. These non-reflective roofing panels can be either transparent or translucent.

As part of the roofing elements that form a weathertight seal, the present invention includes a plurality of spanning member cap means, a plurality of end cap means, and a plurality of weathertight panel sealing means, all as described above.

In addition to the roofing structure and the weathertight sealing elements, the present invention also comprises elements necessary to gather the reflected solar energy from the reflector. These elements are the same as described above.

Double Row Roof Embodiments

An alternative preferred embodiment of the present invention is to provide for a pair of reflectors between adjacent roof spanning member, such that abutted lower edge to lower edge, they can form an up to a 180 degree cylindrically arcuate form. As in the single row embodiments, there are two main variants. The first uses reflector backing panels, while the second does not. As in other embodiments, the roof comprises a number of elements, starting with a plurality of roof spanning members as described above.

Using Reflector Backing Panels

In the first variant of the double row embodiment, a plurality of reflector backing panels is used as part of the roofing surface. Each reflector backing panel has a concave and cylindrically arcuate configuration of up to 90 degrees, a lower edge, an upper edge, and curved lateral edges. The reflector backing panels are disposed adjacent to one another along the respective curved lateral edges to form a first row and a second row between adjacent roof spanning members for up to the entire length of the roof spanning members. The first row and the second row are disposed such that the lower edges of the reflector backing panels in the first row are adjacent to the lower edges of the reflector backing panels in the second row. At least one of the curved lateral edges of at least one reflector backing panel disposed in each row attaches either to the upper panel support points of the underlying roof spanning member, to the lower panel support points of the underlying roof spanning member, or to a combination of the above. One of ordinary skill in the art can vary the support points allowed through changing the strength of the reflector backing panel. Thus, each reflector backing panel need not be attached to support points. Each reflector backing panel is disposed such that the skyward surface is the concave surface. Also, each reflector backing panel is dimensioned and configured along the curved lateral edges wherein the curved lateral edge of a reflector backing panel can be placed adjacent along the curved lateral edge of another reflector backing panel for the length of the underlying roof spanning member so as to form the row of adjacent reflector backing panels. One of ordinary skill in the art can use various materials to construct a reflector backing panel, including fabricated metals or alloys, and molded laminates or composites.

On top of each reflector backing panel lies a reflector as described above in the Single Row Roof Embodiment section.

As part of the roofing elements that form a weathertight seal, the present invention includes a plurality of spanning member cap means, a plurality of end cap means, and a plurality of weathertight panel sealing means, also as described above.

In addition to the roofing structure and the weathertight sealing elements, the present invention also comprises elements necessary to gather the reflected solar energy from the reflector. These solar energy gathering elements are the same as described above in the first variant of the single row embodiment.

Figure 14:
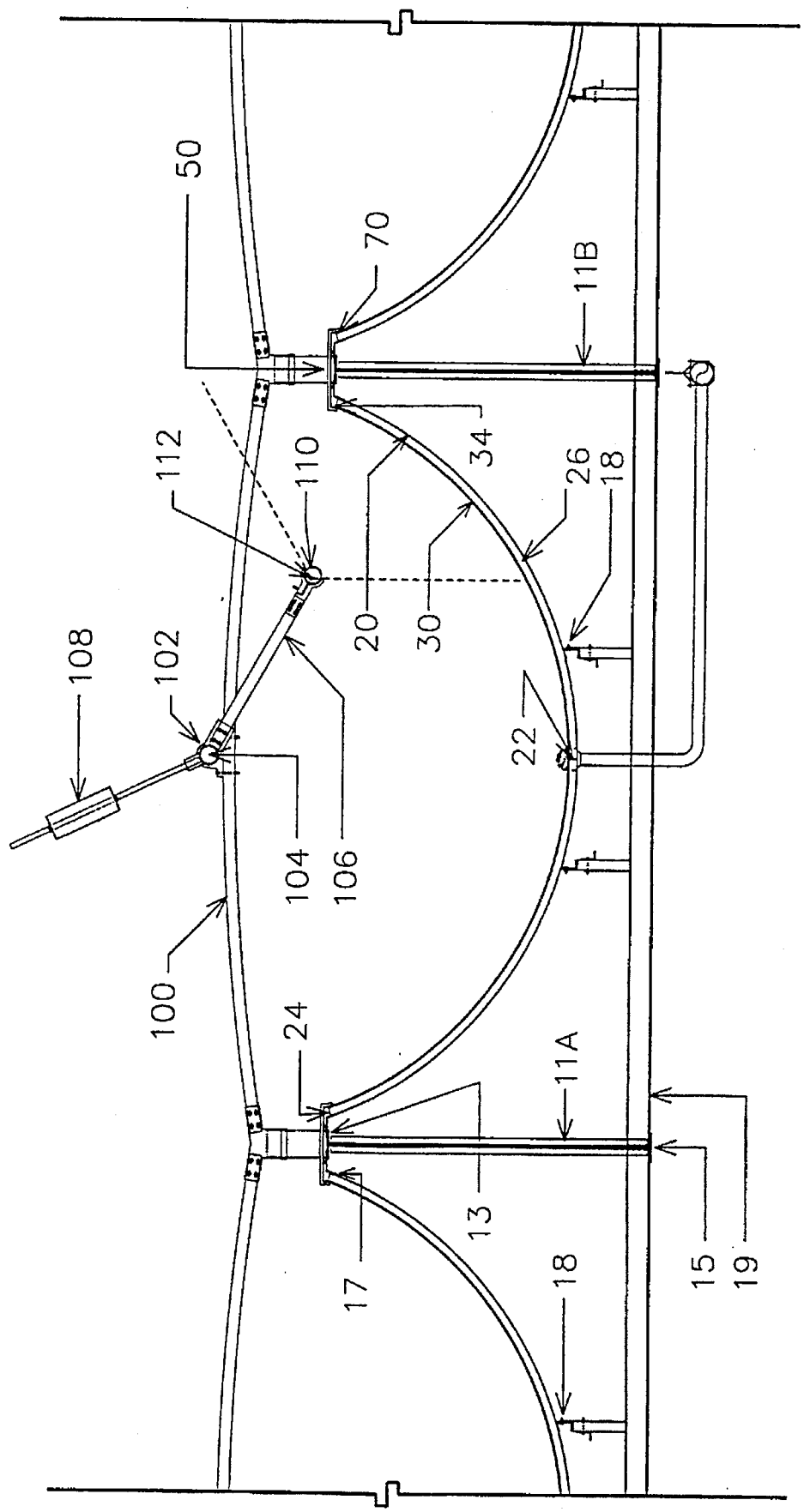
FIG. 14 is a sectional view of an embodiment of the present invention using a flat truss and a double row of reflectors.
Figure 15:
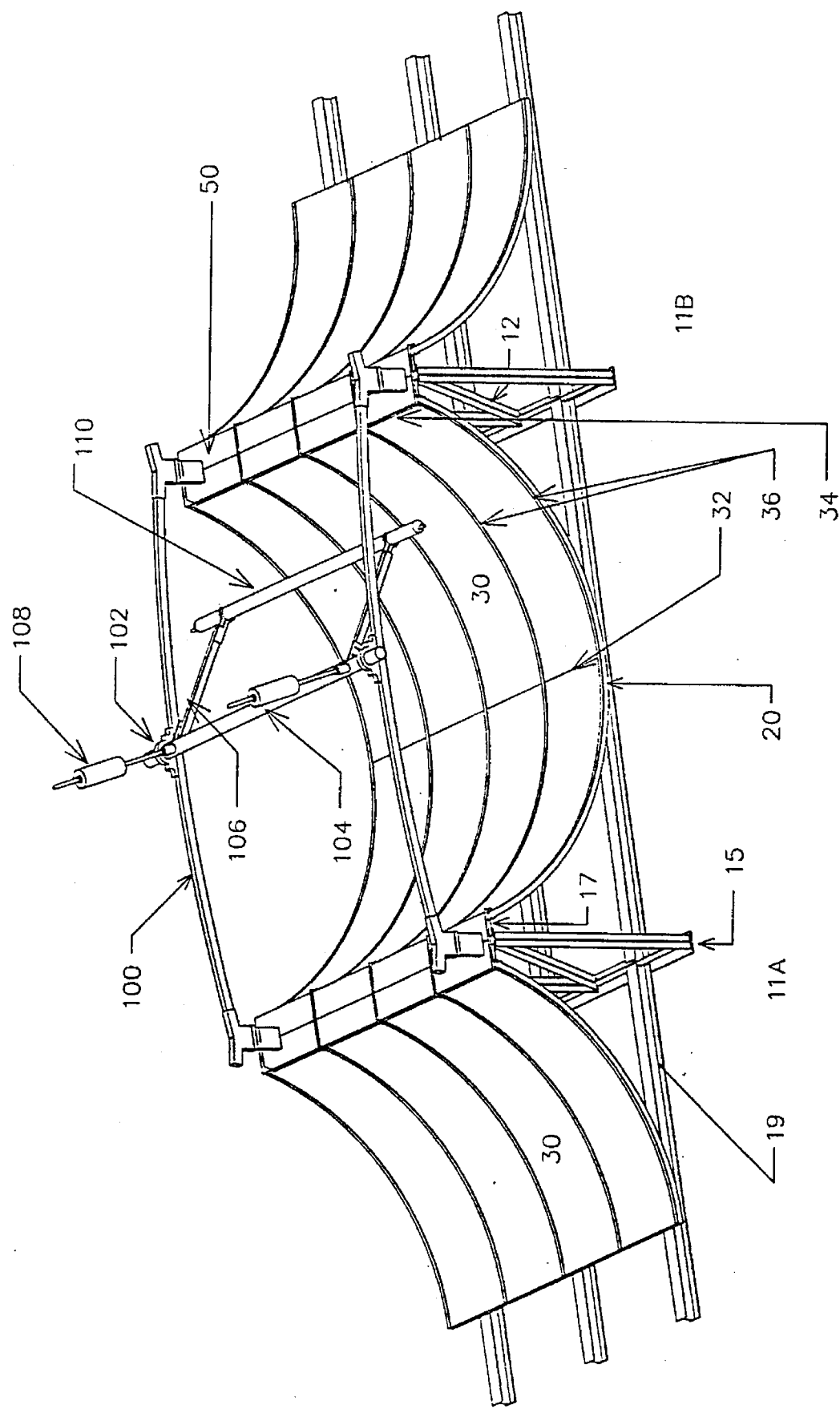
FIG. 15 is an isometric view of an embodiment of the present invention using a flat truss and a double row of reflectors.

FIGS. 14 and 15 illustrates the variant of the double row reflector design that uses reflector backing panels. If a new structure is being built, then one would prefer to orient the roof spanning members of the new structure such that the collector in the present invention is oriented in a lengthwise direction, i.e., follows the direction formed by the lower edge of the reflectors, which is within 30 degrees of a true North-South axis. However, the present invention can be used on structures having any orientation. In this preferred embodiment, a plurality of flat trusses (11A and 11B) are used as the roof spanning member. Each flat truss is comprised of a plurality of web sections (12) disposed between an upper chord (13) and a lower chord (15). A plurality of transverse joist members (19) are connected to the lower chord. With such a flat truss, the upper panel support points (17) are located at or near the upper chord, and the lower panel support points (18) are located at or near the lower chord, the transverse joint members, or a combination thereof. The flat trusses are dimensioned and configured to support the weight of all of the roof supported elements described below, as well as conventional dead loads, such as roof-mounted air conditioning elements, and live loads, such as wind and snow.

With the present improvement, a reflector backing panel (20) underlies each solar energy concentrating reflector (30). This reflector backing panel has a concave and cylindrically arcuate configuration of up to 90 degrees, a lower edge (22), an upper edge (24), and curved lateral edges (26). The reflector backing panels are dimensioned and configured along the curved lateral edges such that one reflector backing panel can be located laterally adjacent to another reflector backing panel so as to form a row of reflector backing panels extending for up to the length of the underlying space truss. In addition, the reflector backing panel is made so as to provide dimensional or configurational stability to the overlying reflector. Suitable embodiments of the reflector backing panel are described above.

A plurality of flexible solar energy concentrating reflector are used. Each reflector (30) is flexible enough to assume a concave and cylindrically arcuate configuration complementary to the underlying reflector backing panel. Each reflector has a lower edge (32), an upper edge (34), and, when in place, curved lateral edges (36). The skyward surface of the reflector is the concave surface. Each reflector is dimensioned and configured along the lateral edges such that one reflector can be located adjacent to another reflector so as to form a row of reflectors extending for up to the length of the underlying space truss. Such a reflector can be comprised of a ultraviolet-stabilized plastic having a reflectorized concave surface as described above.

As part of the roofing elements that form a weathertight seal, the present invention includes a plurality of spanning member cap means (50). Also included is the end cap means (60), not shown in FIGS. 14 and 15. Both of these elements are as described in the Single Reflector Row section.

In order to keep leaks from occurring between adjacent reflector backing panels or reflectors, the present invention includes a plurality of weathertight panel sealing means. The panel sealing means (70), of conventional design, are located at various seams including at the lateral edges, the upper edge, and the lower edge of each reflector backing panel.

A collector support means spans across and above the double row of reflectors as described in the Single Row Roof Embodiment section.

A reflected solar energy collector (110) is connected to the collector support means by lower support members. The collector has a compound parabolic design is located and operates, as described in the Single Row Roof Embodiment section.

A fluid transport system (not shown) connects the conduit of each collector to a thermal energy use means or an energy storage means. The fluid transport means circulates the solar energy-heated fluid.

Using Reflectors Without Reflector Backing Panels

In the second variant of the double row embodiment of the present invention, a plurality of reflectors is used as part of the roofing surface, without the need for reflector backing panels. The roof comprises a plurality of roof spanning members, as described above. A plurality of reflectors is used as part of the roofing surface. Each reflector has a concave and cylindrically arcuate configuration of up to 90 degrees, a lower edge, an upper edge, and curved lateral edges. The reflectors are disposed adjacent to one another along the respective curved lateral edges to form a first row and a second row between adjacent roof spanning members covering the entire length of the roof spanning members.

The first row and the second row are disposed such that the lower edges of the reflectors in the first row are adjacent to the lower edges of the reflectors. At least one of the curved lateral edges of at least one reflector disposed in each row attaches either to the upper panel'support points of the underlying roof spanning member, to the lower panel support points of the underlying roof spanning member, or to a combination of the above. One of ordinary skill in the art can vary the support points allowed through changing the strength of the reflector. Thus, each reflector need not be attached to support points. Each reflector is disposed such that the skyward surface is the concave surface. As in conventional solar energy concentrating systems, each reflector has a skyward facing surface that reflects radiant solar energy. Also, each reflector is dimensioned and configured along the curved lateral edges wherein the curved lateral edge of a reflector can be placed adjacent along the curved lateral edge of another reflector for the length of the underlying roof spanning member so as to form each row of adjacent reflectors. One of ordinary skill in the art can use various materials to construct such a reflector, including fabricated metals or alloys with polished or reflectorized surfaces, and molded laminates or composites with reflectorized surfaces.

As part of the roofing elements that form a weathertight seal, the present invention includes a plurality of spanning member cap means, a plurality of end cap means, and a plurality of weathertight panel sealing means, all as described above.

In addition to the roofing structure and the weathertight sealing elements, the present invention also comprises elements necessary to gather the reflected solar energy from the reflector. These solar energy gathering elements are the same as described above in the first variant of the single row embodiment.

Additional Features

Figure 2:
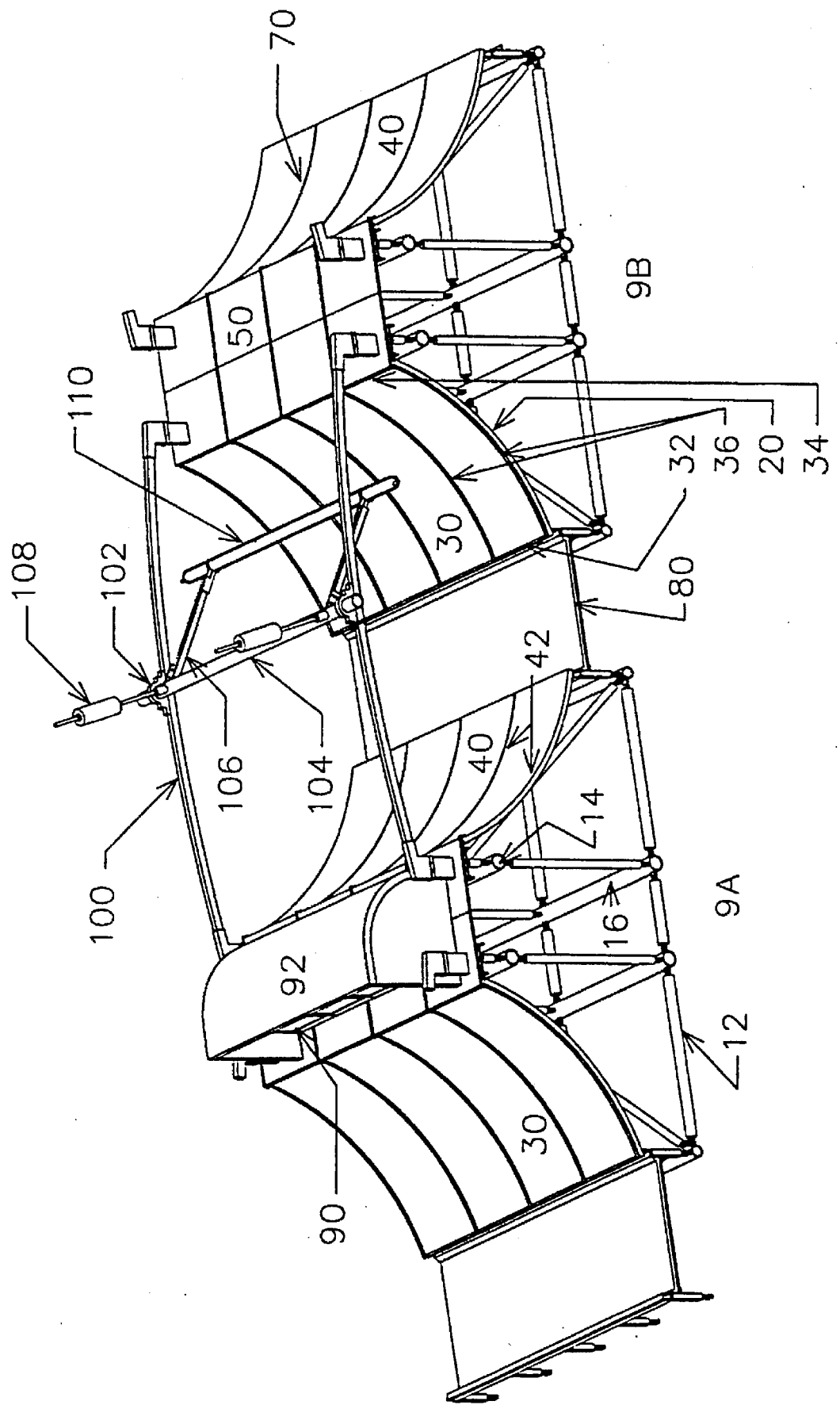
FIG. 2 is an isometric view of an embodiment of the present invention using a complex space truss, an upright daylighting means, and a gutter means.
Figure 3:
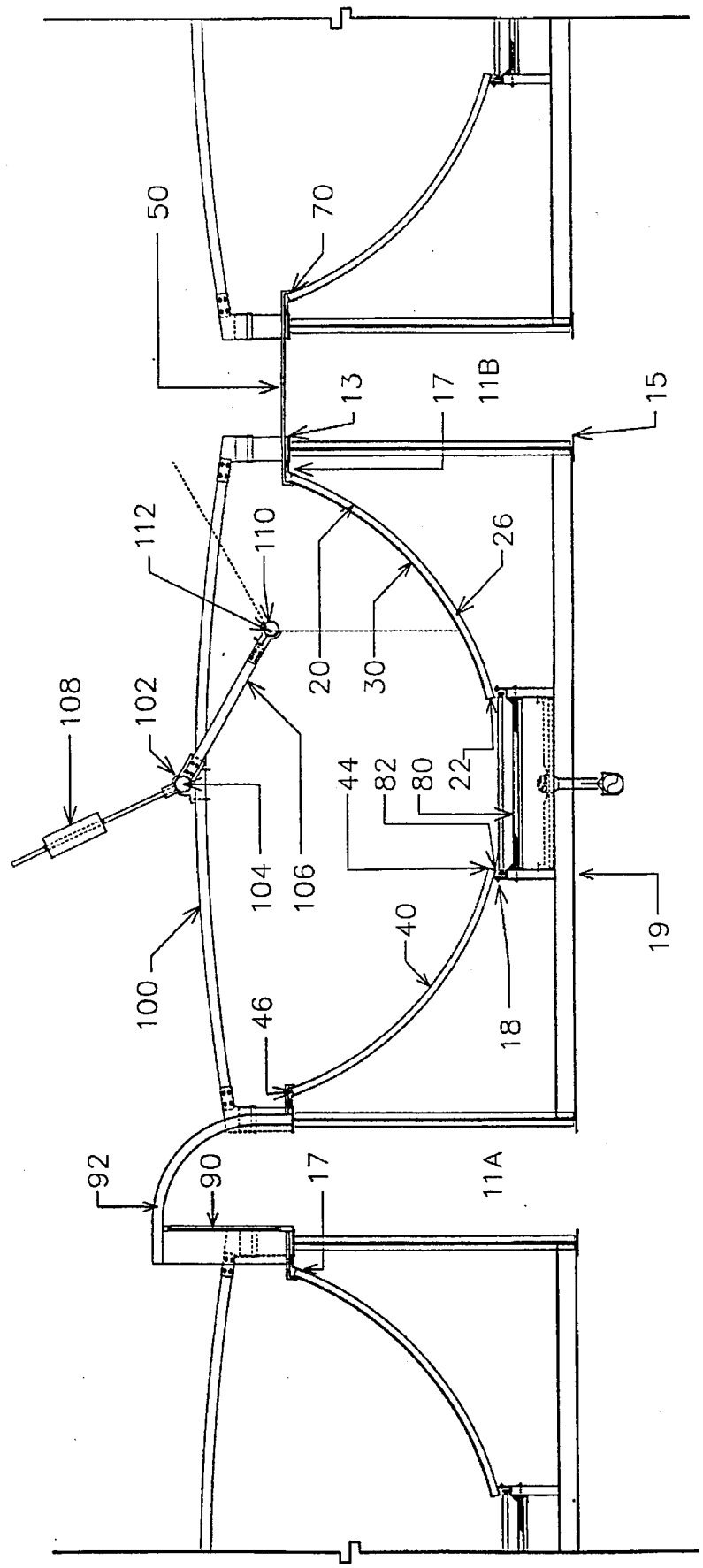
FIG. 3 is a sectional view of an embodiment of the present invention using a flat truss, a single row of reflectors, and a single row of non-reflective roofing panels.
Figure 4:
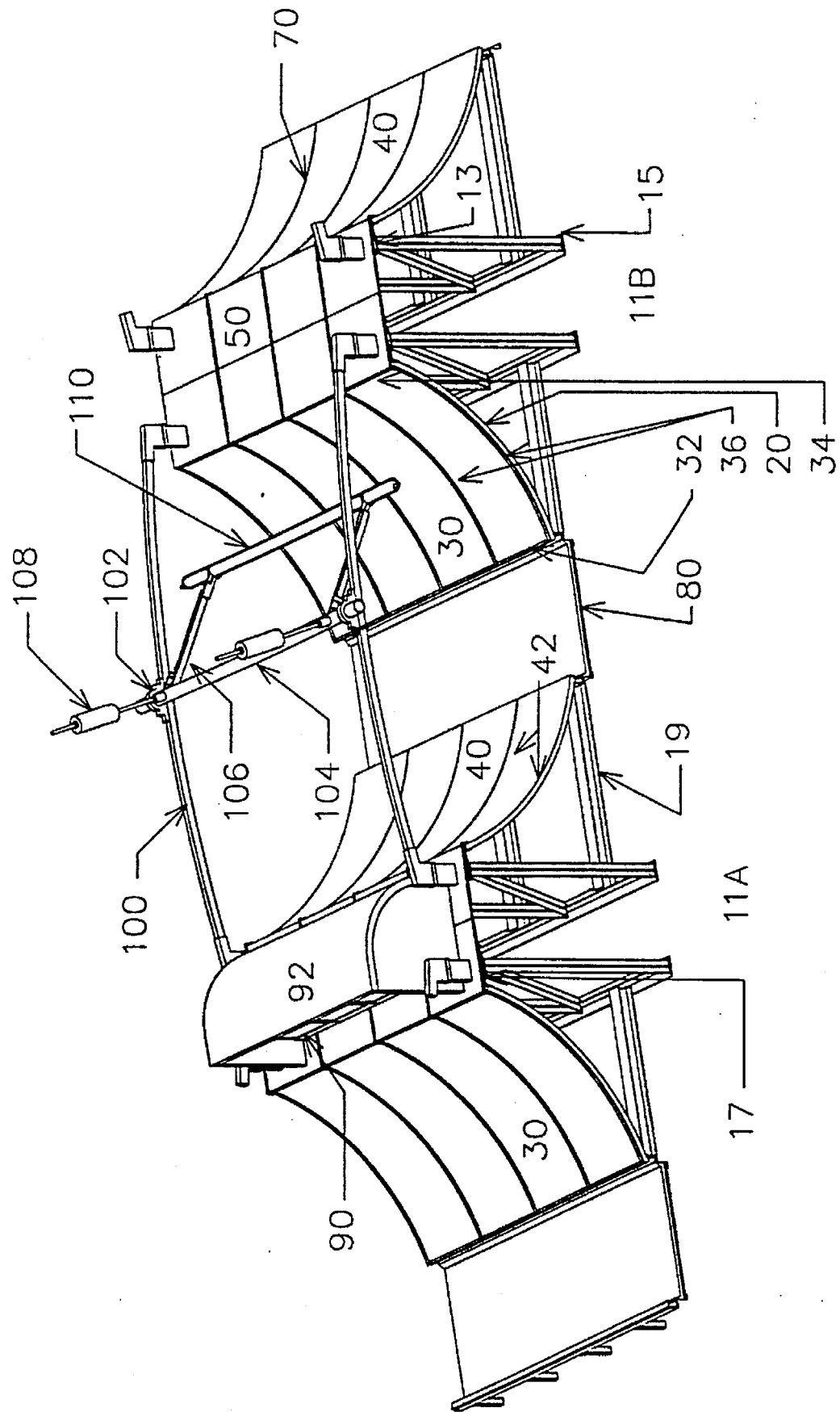
FIG. 4 is an isometric view of an embodiment of the present invention using a flat truss, a single row of reflectors, and a single row of non-reflective roofing panels.

Preferred embodiments of the present invention, whether of the single reflector row embodiment or the double reflector row embodiment, in variants using reflectors only or reflector backing panels, can include a number of additional features. For example, when selecting a truss for the roof spanning member, as one would if spanning greater than 24 feet and not desiring supporting uprights between the ends of the roof spanning member, one can choose between a space truss or a flat truss to be used in the present invention. With a simple space truss (10), one can use a triangular design, as shown in FIGS. 5, 6, 9, 11, 12, and 13, a complex space truss (9) as shown in FIGS. 1 and 2, or a flat truss (11), as shown in FIGS. 3, 4, 7, 8, 14, and 15.

In all embodiments using reflector backing panels, the reflectors and the underlying reflector backing panels can be dimensioned and configured such that each reflector may be detached without removing the underlying reflector backing panel and without affecting the weathertight panel sealing means. Such a configuration allows for the easy replacement of reflectors without disturbing the weathertight integrity of the roof.

Another preferred feature for the present roof is to provide for gutter means at the lower edges of the reflectors. Two benefits arise from this practice. First, the gutter means remove debris from settling on the reflector surface, maintaining a high reflectivity, and thus, energy yield for the solar energy concentrating components. Second, the gutter can be designed to be wide enough and strong enough to support a person, maintenance equipment, and the like. Thus, maintenance can be performed on the roof without having to step on the reflectors, thereby preventing damage to the reflective surfaces. The present roof can have a plurality of gutter means, each gutter means (80) being located between adjacent roof spanning members, as shown in FIGS. 1 to 11 and 14 to 15. Each gutter means extends the length of the roof spanning members and is located below the lower edges of the row of adjacent reflectors. The gutter means are connected either to the underlying roof spanning member, the lower panel support points, the adjacent reflectors, the adjacent reflector backing panels or a combination thereof. To maintain the weathertight integrity of the present roof, a plurality of weathertight gutter sealing means is included with the gutter means. Each gutter sealing means (82) is disposed between each gutter means and the lower edges of the adjacent reflector backing panels, the lower edges of the adjacent reflectors, or a combination thereof. Such sealing means are of conventional design and are known to those of skill in the art.

To enhance the utility of the present roof, insulation means can be provided for the various roof surface components. Thus, the reflector backing panels, reflectors, end cap means, spanning member cap means, and gutter means can have an insulating means disposed beneath or attached to these elements or incorporated into these elements gutter means.

Another preferred feature for the present invention is to use daylighting means in the roof so as to lower lighting costs for the underlying structure by providing for ambient light to go into the structure. A daylighting means can be made of either a transparent or translucent material. One way of providing daylighting comprises the spanning member cap means being dimensioned and configured such that at least one daylighting means is located on a surface of the spanning member cap means. In other words, flat glass panels can be inset into the spanning cap means, not shown. A second way is to use a raised transparent or substantially translucent daylighting panel (90), as shown in FIGS. 1 to 4. Such a panel is disposed substantially vertically from the surface of the spanning member cap means. A daylighting panel housing (92) is attached to the spanning member cap means, said housing being dimensioned and configured to form a weathertight seal between the raised daylighting panel and the spanning member cap means. A third way of daylighting is to use a transparent or substantially translucent daylighting panel (94) in place of a reflector, or if used, the reflector and the underlying reflector backing panel, as shown in FIG. 14. This daylighting panel would be dimensioned and configured so as to form a weathertight seal with either an adjacent daylighting means, an adjacent reflector, an adjacent reflector backing panel, or a combination thereof. A fourth way to provide daylighting can be used in the preferred single reflector row embodiments. Here, one or more of the non-reflective roofing panels can be substituted for with a transparent or translucent replacement daylighting panel (94), also shown in FIG. 3. Any combination of the above, in the appropriate roof embodiments, can be used to provide a desired level of daylighting.

Another feature suitable for the present roof is to provide for the weathertight panel sealing means to be integrated into the reflectors, the reflector backing panels, the non-reflective roofing panels, or the replacement daylighting panels by designing the edges of these roofing surface elements to have an interlocking means that does not allow water to penetrate between such adjacent roofing elements.

All publications or unpublished patent applications mentioned herein are hereby incorporated by reference thereto.

Other embodiments of the present invention are not presented here which are obvious to those of ordinary skill in the art, now or during the term of any patent issuing from this patent specification, and thus, are within the spirit and scope of the present invention.

We claim:

1. An improved solar energy concentrating system having:

a) at least one solar energy primary concentrating reflector having a concave and cylindrically arcuate configuration of up to about 220 degrees, a lower edge, an upper edge, and curved lateral edges, the skyward surface of the reflector being the concave surface;

b) a structural support means disposed beneath and attached to the reflector, said support means being dimensioned and configured to support the weight of at least the reflector, a compound parabolic secondary solar energy collector, and a collector support means;

c) a collector support means spanning across and above the reflector, said collector support means being connected to a solar energy collector and either the structural support means or a supporting surface that underlies the structural support means, and said collector support means being dimensioned and configured so as to support the solar energy collector and allow it to move arcuately;

d) a linear secondary solar energy collector having a compound parabolic cross-section, said collector extending laterally across the reflector, said collector being located and disposed so as to move arcuately within a predetermined focal zone for collecting reflected solar energy from the reflector, and said collector being dimensioned and configured to receive the reflected solar energy into a conduit through which an energy transfer fluid flows, said fluid being heated by the reflected solar energy;

e) a means for positioning the collector in an optimal position within the focal collection zone throughout a defined solar cycle, said positioning means being connected to the collector support means; and f) a fluid transport means which connects the conduit of the collector to a thermal energy use means or an energy storage means, wherein the fluid transport means circulates the solar energy-heated fluid through the conduit.

2. The solar energy concentrating system of claim 1 wherein the positioning means is controlled by a microprocessor which periodically calculates an optimal position within the focal collection zone for the collector to receive the reflected solar energy from the reflector.

3. The solar energy concentrating system of claim 1 wherein the collector is oriented lengthwise within 30 degrees of a true East-West axis.

4. The solar energy concentrating system of claim 1 comprising two reflectors, wherein a first reflector is adjacent along the entire lower edge to the lower edge of a second reflector, each reflector having a cylindrically arcuate configuration of up to about 110 degrees.

5. The solar energy concentrating system of claim 1 wherein the collector support means includes at least two collector support members, each being disposed at either end of the collector.

6. The solar energy concentrating system of claim 4 wherein the collector is oriented lengthwise within 30 degrees of a true North-South axis.

* * * * *